(12) United States Patent
Olsen et al.

(10) Patent No.: US 8,816,251 B2
(45) Date of Patent: Aug. 26, 2014

(54) HEATING OR COOLING MAT

(75) Inventors: Leif Olsen, Boerkop (DK); Thomas Melballe, Vejle (DK); Taj Bernth, Vejle (DK); Verner Utoft, Jelling (DK)

(73) Assignee: Danfoss A/S, Nordborg (DK)

( * ) Notice: Subject to any disclaimer, the term of this patent is extended or adjusted under 35 U.S.C. 154(b) by 1104 days.

(21) Appl. No.: 12/158,184

(22) PCT Filed: Dec. 20, 2006

(86) PCT No.: PCT/DK2006/000729
§ 371 (c)(1),
(2), (4) Date: Sep. 22, 2008

(87) PCT Pub. No.: WO2007/082535
PCT Pub. Date: Jul. 26, 2007

(65) Prior Publication Data
US 2009/0050616 A1   Feb. 26, 2009

(30) Foreign Application Priority Data

Dec. 23, 2005   (DE) .......................... 10 2005 061 784

(51) Int. Cl.
*H05B 1/00* (2006.01)
*H05B 3/34* (2006.01)
*A47C 21/04* (2006.01)
*F24D 13/02* (2006.01)
*F24D 3/14* (2006.01)

(52) U.S. Cl.
CPC ................ *F24D 3/141* (2013.01); *F24D 13/02* (2013.01); *H05B 2203/003* (2013.01); *H05B 3/342* (2013.01); *H05B 2203/014* (2013.01); *H05B 2203/017* (2013.01)
USPC ................ 219/212; 219/529; 219/549; 5/421

(58) Field of Classification Search
CPC .......... E04F 15/02; F24D 13/02; F24D 13/14; H05B 3/34; A61F 7/0097; H01L 2224/48227
USPC ................ 219/212, 529, 549; 5/421
See application file for complete search history.

(56) References Cited

U.S. PATENT DOCUMENTS

| 3,976,855 A | 8/1976 | Altmann et al. |
| 4,056,420 A | 11/1977 | Adams |

(Continued)

FOREIGN PATENT DOCUMENTS

| DE | 4136019 A1 | 5/1992 |
| DE | 19641179 C1 | 5/1998 |

(Continued)

OTHER PUBLICATIONS

Bau, Thermal floor with double sided tape, Machine translated DE 29812219 U1 from German to English, pp. 1-3, printed on Feb. 3, 2014.*
The PCT International Search Report for PCT/DK2006/000729 dated Mar. 9, 2007.

*Primary Examiner* — Narayan Bhat
(74) *Attorney, Agent, or Firm* — McCormick, Paulding & Huber LLP

(57) ABSTRACT

The invention concerns a heating or cooling mat (1) with a carrying sheet (2) having a top side (9) and a bottom side (11), and at least one heating and cooling unit (5) located on the carrying sheet (2), an adhesive being located on the bottom side (11) of the carrying sheet (2). It is endeavored to improve the handling properties of the heating or cooling mat. For this purpose, the adhesive is located on a double-sided adhesive tape (12), which is fixed on the bottom side (11) of the carrying sheet (2), the adhesive on the bottom side of the adhesive tape (12) being covered by the top side of the carrying sheet (2) and the adhesive tape (12) bonding with the top side of the carrying sheet (2) in the rolled up state of the heating or cooling mat (1).

6 Claims, 1 Drawing Sheet

(56) References Cited

U.S. PATENT DOCUMENTS

| | | | |
|---|---|---|---|
| 4,990,744 A | 2/1991 | Willner | |
| 5,908,573 A | 6/1999 | Chiles et al. | |
| 5,998,770 A | 12/1999 | Sundby | |
| 6,184,496 B1 | 2/2001 | Pearce | |
| 6,254,582 B1* | 7/2001 | O'Donnell et al. | 604/385.05 |
| 6,294,768 B1 | 9/2001 | Liebich | |
| 6,303,905 B1 | 10/2001 | Chiles et al. | |
| 6,552,310 B1* | 4/2003 | Hulldin et al. | 219/528 |
| 6,940,054 B1* | 9/2005 | Heggdal | 219/629 |
| 2005/0025925 A1* | 2/2005 | O'Connor | 428/40.1 |
| 2006/0086717 A1* | 4/2006 | Oosterling | 219/528 |

FOREIGN PATENT DOCUMENTS

| | | |
|---|---|---|
| DE | 298 12 219 U1 | 1/2000 |
| EP | 0369293 A2 | 5/1990 |
| EP | 1157241 A | 11/2001 |
| EP | 1638371 A | 3/2006 |
| FR | 2324187 | 4/1977 |
| FR | 2642929 A1 | 8/1990 |
| GB | 1017160 | 1/1966 |
| WO | 0025069 A1 | 5/2000 |

\* cited by examiner

HEATING OR COOLING MAT

CROSS REFERENCE TO RELATED APPLICATIONS

This application is entitled to the benefit of and incorporates by reference essential subject matter disclosed in International Patent Application No. PCT/DK2006/000729 filed on Dec. 20, 2006 and German Patent Application No. 10 2005 061 784.0 filed Dec. 23, 2005.

FIELD OF THE INVENTION

The invention concerns a heating or cooling mat with a carrying sheet having a top side and a bottom side, and at least one heating and cooling unit located on the carrying sheet, an adhesive being located on the bottom side of the carrying sheet.

BACKGROUND OF THE INVENTION

Such a mat is, for example, known from EP 1 157 241 B1. The carrying sheet has the form of a grid, on which a heating cable is arranged in a snake shape, longitudinal sections of the heating cable extending in parallel with grid wires. The heating cable is fixed on the top side of the carrying sheet by means of a grid-shaped adhesive tape. An adhesive material is put onto the bottom side of the grid. This adhesive material serves the purpose of fixing the grid on a foundation when installing the mat. When the mat has been fixed onto the foundation, for example a plaster or the like, it is covered by another layer, for example a filler or a tile cement.

In the most cases, this method will be sufficient for fixing the heat conducting mat on the floor.

In connection with certain substances, which are put onto the heat conducting mat, particularly self-levelling pouring compounds with a high water content, however, this kind of fixing may cause problems. The water can namely be able to penetrate under the adhesive material, so that the heat conducting mat disengages from the underground and lifts or swims up to the surface of the pouring compound. This does not only require an additional refinishing, which can involve substantial efforts and costs. Also the temperature profile of the floor, in which the heat conducting mat is located, will then be unequal, that is, areas exist, in which the layer covering the heat conducting mat is thinner than in other areas, so that here a higher temperature is obtained on the surface of the floor.

SUMMARY OF THE INVENTION

The invention is based on the task of improving the handling properties of the heating or cooling mat.

With a heating or cooling mat as mentioned in the introduction, this task is solved in that the adhesive is located on a double-sided adhesive tape, which adheres to the bottom side of the carrying sheet, the adhesive on the bottom side of the adhesive tape being covered by the top side of the carrying sheet and the adhesive tape adhering to the top side of the carrying sheet in the rolled up state of the heating or cooling mat.

With this embodiment, the choice of adhesive for fixing the heating or cooling mat on the underground is much more free. Thus, an adhesive tape with a high fixing ability can be used, and the adhesive can even be water proof, so that also self-levelling pouring compounds with high water content can be used. The double-side adhesive tape, whose upper side is fixed on the bottom side of the carrying sheet, then fixes the carrying sheet on the underground. However, the use of a double-side adhesive tape is problematic, as a double-side adhesive tape will have an adhesive surface facing downwards, when fixed on the carrying sheet. This adhesive surface would be disturbing during handling, so that usually the free side of a double-side adhesive tape is covered by a protective plastic sheeting. If, however, this protective plastic sheeting would remain on the bottom side of the adhesive tape, the removal of this sheeting during installation of the heating or cooling mat would require substantial efforts. Not only, the heating or cooling mat should be unrolled, also the protective plastic sheeting should be removed during the unrolling. This elaborate handling is substantially simplified according to the invention. It is sufficient merely to unroll the heating or cooling mat for installation. In the rolled up state, the adhesive bottom side of the double-side adhesive tape is covered by the usually non-adhesive top side of the carrying sheet, so that it is protected before the unrolling and cannot get stuck anywhere on the outside. Merely on the circumference of the outer turn of the heating or cooling mat the adhesive bottom side of the double-side adhesive tape is open outwards. During transport, however, the rolled up heating or cooling mat is wrapped anyway, so that the wrapping can be used for covering the adhesive layer on the bottom side of the double-side adhesive tape. Further, this embodiment has an additional advantage. Once rolled up, the heating or cooling mat will not unroll, as the adhesive layer on the bottom side of the double-side adhesive tape bonds on the top side of the carrying sheet, thus preventing that the rolled up heating or cooling mat unrolls and enlarges its diameter. A small force will be required for unrolling the heating or in order to disengage the adhesive bonding between the adhesive layer on the bottom side of the adhesive tape and the top side of the carrying sheet. The unrolling process, however, can take place in a very controlled manner.

Preferably, the heating and cooling unit is fixed on the carrying sheet by means of an adhesive strip adhering to the top side of the carrying sheet, the adhesive strip and the adhesive tape overlapping each other in the rolled up state of the heating or cooling mat. The adhesive strip is then used for two purposes. Firstly, it fixes the heating and cooling unit on the carrying sheet. Secondly, it forms the surface, on which the adhesive of the adhesive tape is fixed on the top side of the carrying sheet. Thus, the design and the properties of the top side of the carrying sheet are freer. The top side of the carrying sheet does not have to be designed so that the adhesive of the adhesive tape easily disengages from it. This property is merely required for the upper side of the adhesive strip.

Preferably, the heating and cooling unit is made to be cable shaped. In order to be able to fix the heating and cooling unit on the carrying sheet by means of an adhesive strip, it is expedient for the adhesive strip to overlap the heating and cooling unit, yet still being fixable on the carrying sheet on both sides of the heating and cooling unit. This is relatively easily realised in that the heating and cooling unit has at least one cable, which is, for example, led in a meander shape across the carrying sheet. In this connection, it is favourable for the heating and cooling unit to have sections, which extend laterally to the longitudinal extension of the adhesive strip.

Preferably, the heating and cooling unit has an electrical cable. An electrical cable is heated, when passed by an electrical current. This is particularly the case, when the electrical cable if formed as a resistance cable. By means of a suitable dimensioning of the resistance values, the predetermination of the heat output can be relatively accurate.

Alternatively or additionally it may be ensured that the heating and cooling unit has a fluid pipe for the passage of a heat carrying medium. For example hot or cold water can be used as heat carrying medium. With hot water, the heating and cooling unit is used for heating a room. With cold water the room can be cooled.

Preferably, the heating and cooling unit is covered by a top layer. In this case, the heating and cooling unit is located in a relatively protected position between two layers. Openings can be provided in the top layer for fixing the adhesive strip on the carrying sheet or the top layer itself can be used as an adhesive surface, that is, as an adhesive strip.

Preferably, the carrying sheet is permeable for adhesive, and the adhesive tape and the adhesive strip bond with each other through the carrying sheet. This enables an improved fixing of the heating and cooling unit on the carrying sheet. The adhesive strip and the adhesive tape do not only bond on the top side or the bottom side of the carrying sheet, respectively. On the contrary, the adhesive strip and the adhesive tape bond on each other, the carrying sheet being between them, so that in a manner of speaking a kind of form fitting is achieved, in which the adhesive tape and the adhesive strip bond relatively closely with each other, enclosing the carrying sheet and the heating and cooling unit between them.

Preferably, the adhesive strip has a surface, which causes a substantially poorer bonding engagement with the adhesive on the bottom side of the adhesive tape than the bonding engagement of the adhesive of the adhesive strip with the top side of the carrying sheet. When unrolling the heating or cooling mat, the adhesive tape will disengage from the adhesive strip, whereas the adhesive strip will not disengage from the carrying sheet. A damaging of the heating or cooling mat when unrolling is thus reliably avoided.

It is also advantageous, when the upper side of the adhesive strip has a non-stick coating. A non-stick coating makes it possible for the adhesive tape to be removed from the upper side of the adhesive strip without problems. Remainders of the adhesive of the adhesive tape on the upper side of the adhesive strip are thus avoided. Also the force required for unrolling the heating or cooling mat is kept small.

It is also advantageous when the adhesive on the bottom side of the adhesive tape corresponds with the adhesive on the bottom side of the adhesive strip. Usually, the adhesive strip is delivered in a rolled-up state in the form of a roll. Before it can be bonded with the carrying sheet and the heat cable mounted thereon, it must be unrolled from the roll. It is thus required that the adhesive of the adhesive strip is easily disengaged from the upper side of the next layer of the adhesive strip. When, now, the same adhesive is used on the bottom side of the adhesive tape, this condition is also given for the interaction of adhesive tape and adhesive strip, so that when unrolling the heating or cooling mat problem are not to be expected.

BRIEF DESCRIPTION OF THE DRAWINGS

In the following, the invention is described on the basis of a preferred embodiment in connection with the drawings, showing.

DETAILED DESCRIPTION OF THE PREFERRED EMBODIMENTS

A heat conducting mat 1 has a carrying sheet 2 in the form of a grid. The carrying sheet 2 thus has longitudinal fibres 3, which extend in the longitudinal direction of the carrying sheet, and transverse fibres 4, which extend diagonally to the longitudinal direction. (In many cases, the longitudinal fibres 3 are also called warp and the transverse fibres 4 are also weft.

Figure 1:
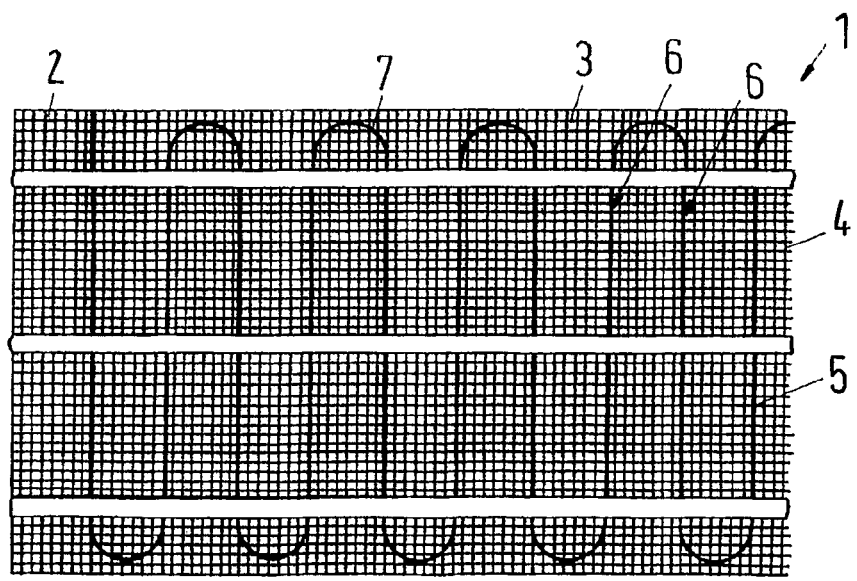
FIG. 1 is a top view of a heating or cooling mat in the form of a heat conducting mat.

On the surface of the carrying sheet 2 visible in FIG. 1 is located a heating cable 5, which has a plurality of sections extending in parallel with the transverse fibres 4. These sections 6 are connected with each other by means of arched sections 7. In a manner not shown, an electrical current can be led through the heating cable 5 via terminals, which are also not shown, said current converting electrical energy into heat energy.

The heating cable 5 is fixed on the top side 9 of the carrying sheet 2 by means of three unilaterally bonding adhesive strips 8. This is easily realised in that after placing the heating cable 5 the adhesive strip 8 is fitted on the top side 9 of the carrying sheet 2. Of course also a larger or smaller number of adhesive strips 8 can be used.

On the bottom side facing the carrying sheet 2, the adhesive strip 8 has an adhesive layer, which at the end causes the bonding with the carrying sheet 2. The adhesive strip 8 has an upper side 10, which is non-adhesive, and which can even have a non-stick coating, for example of PTFE.

Figure 2:
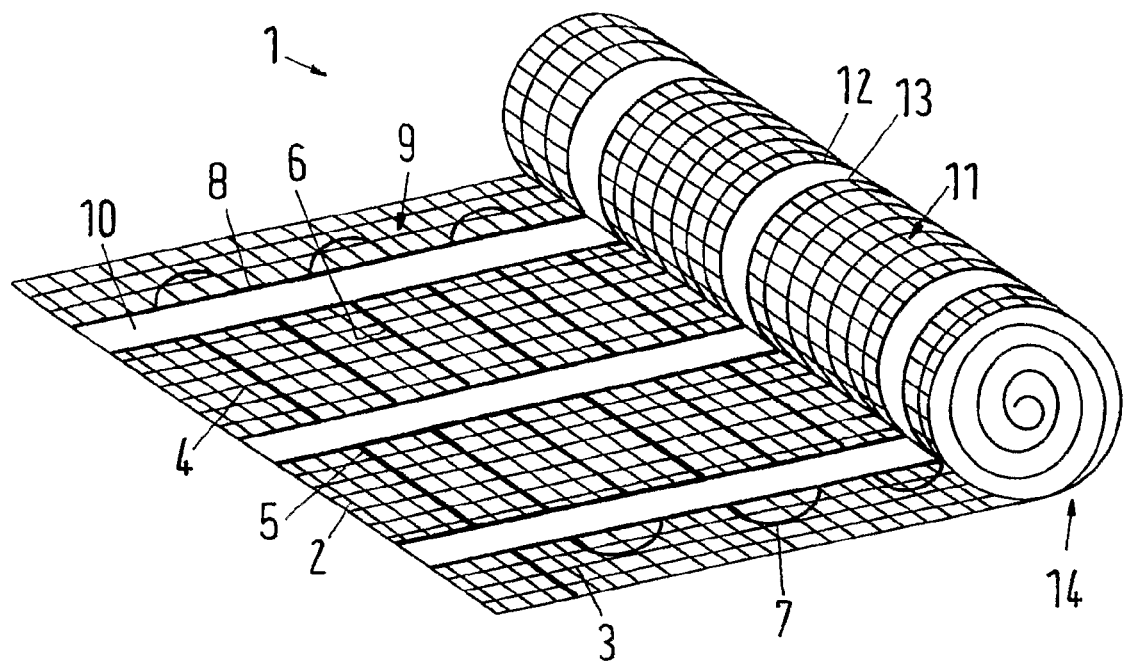
FIG. 2 is a heat conducting mat in the rolled-up and partly unrolled state.

The carrying sheet 2 also has a bottom side 11, which can only be seen in FIG. 2, as here the carrying sheet 2 with the heating cable 5 and the adhesive strip 8 is rolled up. For presentation reasons, the carrying sheet 2 in FIG. 2 is shown in a partly unrolled state.

On the bottom side 11 of the carrying sheet several double-sided adhesive tapes 12 are fitted, in the present case also three. Each adhesive tape 12 is located at the bottom side 11 exactly where an adhesive strip 8 is located at the top side 9. Thus, each adhesive tape 12 overlaps with an adhesive strip 8. Due to the grid structure, the carrying sheet 2 is permeable for the adhesive of the adhesive strip 8 and/or the adhesive tape 12, so that the adhesive strip 8 and the adhesive tape 12 bond with each other through the carrying sheet 2. This embodiment improves the cohesion of the carrying sheet 2 with the heating cable 5, the adhesive strip 8 and the adhesive tape 12.

The adhesive tape 12 is made as double-sided adhesive tape, which is not only provided with adhesive on the upper side facing the carrying sheet 2, but also on its bottom side 13, whose outer layer also turns outwards in the rolled-up state of the carrying sheet 2.

Inside the outer layer of the carrying sheet 2 the bottom side 13 with the adhesive located here is covered by the upper side 10 of the adhesive strip 8, so that two positive effects can be obtained: Firstly, in the rolled up state, a roll 14 of the heat conducting mat 1 remains stable, as the double-sided adhesive tape 12 bonds with the adhesive strip 8. Secondly, when unrolling the heat conducting mat 1 from the roll 14, a bottom side with a high adhesive force will be available at once, without requiring the removal of protective plastic sheeting from the double-sided adhesive tape 12.

Thus, the installation of such a heat conducting mat is extremely simple. The installer merely has to place a small, already unrolled, piece of the heat conducting mat 1 on the underground. As soon as the still rolled-up heat conducting mat 1 has been aligned, the installer can fix the heat conducting mat on the underground by means of a pressure. Then, the heat conducting mat 1 merely has to be unrolled. For this purpose, the installer has to use a little force for unrolling the roll 14 and at the same time disengaging the adhesive bond between the adhesive strip 8 and the adhesive tape 12. However, there is no risk that the roll 14 unrolls by accident, and bonds with areas, where it should not bond. Thus, with simple means it can be ensured that the heat conducting mat only bonds, where it is supposed to bond.

The adhesive, which is located on the bottom side 13 of the double-sided adhesive tape 12, can correspond to the adhesive with which the adhesive strip 8 bonds with the upper side 9 of the carrying sheet 2. The adhesive strip 8 is usually unrolled from a roll, so that the adhesive of the adhesive strip 8 must be able to disengage from the upper side of the adhesive strip 8. When the same adhesive is used on the bottom side 13 of the adhesive tape 12, this condition also applies when the heat conducting mat 1 is rolled up to the roll 14, that is, the adhesive tape 12 also disengages easily from the adhesive strip 8.

In order to facilitate the unrolling, the upper side 10 of the adhesive strip 8 can be provided with a non-stick coating, for example a film of polytetra flour ethylene (PTFE) or the like.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A heating or cooling mat comprising:
   a carrying sheet having a top side and a bottom side;
   at least one heating or cooling unit located on the carrying sheet;
   an adhesive strip fixed on the top side of the carrying sheet, the adhesive strip fixing the at least one heating or cooling unit to the carrying sheet;
   a double-sided adhesive tape having adhesive on a bottom side and a top side, the double-sided adhesive tape being fixed on the bottom side of the carrying sheet opposite the adhesive strip,
   wherein the adhesive strip and the double-sided adhesive tape are arranged such that the adhesive on the bottom side of the double-sided adhesive tape bonds with a top side of the adhesive strip when the heating or cooling mat is rolled up;
   wherein the carrying sheet is permeable for adhesive, such that the double-sided adhesive tape and the adhesive strip bond with each other through the carrying sheet
   wherein the adhesive strip has a surface with a non-stick coating, which causes a substantially poorer bonding engagement with the adhesive on the bottom side of the adhesive tape than the bonding engagement of the adhesive of the adhesive strip with the to side of the carrying sheet.

2. The heating or cooling mat according to claim 1 wherein the heating or cooling unit is made to be cable shaped.

3. The heating or cooling mat according to claim 2 wherein the heating or cooling unit has an electrical cable.

4. The heating or cooling mat according to claim 2, wherein the heating or cooling unit has a fluid pipe for the passage of a heat carrying medium.

5. The heating or cooling mat according to claim 1, wherein the heating or cooling unit is covered by a top layer.

6. The heating or cooling mat according to claim 1, wherein the adhesive on the bottom side of the adhesive tape corresponds with the adhesive on the bottom side of the adhesive strip.

* * * * *